United States Patent
Naumann et al.

(10) Patent No.: US 6,810,042 B1
(45) Date of Patent: *Oct. 26, 2004

(54) METHOD OF QUEUING TRAFFIC TO MANY DESTINATIONS COVERING A WIDE RANGE OF TRANSMISSION SPEEDS WHILE MINIMIZING BUFFER SIZE

(75) Inventors: Joel Naumann, San Jose, CA (US); Shirish Sathe, San Jose, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,038

(22) Filed: Jan. 4, 1999

(51) Int. Cl.[7] .................. H04L 12/28; H04L 12/54; H04J 3/24
(52) U.S. Cl. .................. 370/412; 370/428; 370/474
(58) Field of Search .................. 370/412, 389, 370/390, 473, 428, 395, 359, 474, 419, 463, 445, 395.1, 429, 465, 230, 232, 235, 395.6, 408; 395/220, 200, 250; 379/112; 710/60

(56) References Cited

U.S. PATENT DOCUMENTS

| | | | | |
|---|---|---|---|---|
| 5,165,021 A | * | 11/1992 | Wu et al. | 395/220 |
| 5,414,698 A | * | 5/1995 | Adams | 370/395 |
| 5,625,625 A | * | 4/1997 | Oskouy et al. | 370/395.1 |
| 5,632,019 A | * | 5/1997 | Masiewicz | 395/250 |
| 5,633,865 A | * | 5/1997 | Short | 370/412 |
| 5,737,524 A | * | 4/1998 | Cohen et al. | 395/200.01 |
| 5,802,290 A | * | 9/1998 | Casselman | 395/200.31 |
| 5,812,554 A | * | 9/1998 | Kadambi et al. | 370/473 |
| 5,889,776 A | * | 3/1999 | Liang | 370/389 |
| 5,894,509 A | * | 4/1999 | Kasprzyk et al. | 379/112 |
| 5,915,128 A | * | 6/1999 | Bauman et al. | 710/60 |
| 5,935,213 A | * | 8/1999 | Rananand et al. | 709/234 |
| 5,953,335 A | * | 9/1999 | Erimli et al. | 370/390 |
| 5,959,466 A | * | 9/1999 | McGowan | 326/39 |
| 6,094,439 A | * | 7/2000 | Krishna et al. | 370/445 |
| 6,192,051 B1 | * | 2/2001 | Lipman et al. | 370/408 |
| 6,222,822 B1 | * | 4/2001 | Gerardin et al. | 370/412 |
| 6,240,471 B1 | * | 5/2001 | Schlueter et al. | 710/62 |
| 6,246,690 B1 | * | 6/2001 | DiPlacido et al. | 370/408 |

OTHER PUBLICATIONS

The Basics, Chapter 8, ATM, p. 141–151 (date prior to Jan. 4, 1999).

* cited by examiner

Primary Examiner—Andy Lee
(74) Attorney, Agent, or Firm—Blakely, Sokoloff, Taylor & Zafman LLP

(57) ABSTRACT

A method and apparatus is described that provides queuing traffic to many destinations covering a wide range of communication interface speeds while minimizing buffer size. A plurality of communication interface boards that distribute packets are coupled to a processing module that segments information into packets. Each communication interface board has an individual packet transmission speed. A buffer is provided in the communication interface boards according to the transmission speed of the board.

64 Claims, 4 Drawing Sheets

METHOD OF QUEUING TRAFFIC TO MANY DESTINATIONS COVERING A WIDE RANGE OF TRANSMISSION SPEEDS WHILE MINIMIZING BUFFER SIZE

FIELD OF THE INVENTION

The present invention relates to queuing of traffic to many destinations covering a wide range of communication interface speeds while minimizing queuing buffer size and/or software queue processing overhead in networking systems.

BACKGROUND

As technology improves, the speed of transmission in communication systems such as networking systems is always increasing. As newer and faster communication interfaces are implemented, the need to support older and slower communication interfaces remain. This may be due to the fact that economics prevent the total upgrade of older systems to take advantage of faster communication interfaces. However, various problems exist in supporting both the older and newer interfaces as will be described further below.

Networking is generally known as a configuration of computers and software connected for information interchange through communication interfaces. It has become a gateway in which computer processing and electronic communication have merged into one entity. The goal is to process all information including data, voice and image transmission by digital techniques according to a unified standard such as integrated services digital network (ISDN). In allowing the various computers in a networking system to transmit and receive information, the pool of information accessible by a computer is far greater than that of a stand-alone computer system. Generally, a networking system may be divided into a number of links. A link may be a local area network (LAN) with each LAN capable of supporting several computers. Where the distance between computers is far apart, that network of computers may be defined as a wide area network (WAN). In a networking system supporting tens, hundreds or even thousands of computers, the maintenance of information traffic within the networking system becomes very important.

Generally, for information traffic purposes, information to be transmitted through the networking system for example, using ISDN standard, may be implemented into quantifiable packets known as "frames" or "cells" dependent on the type of communication protocol to be used in the networking system. Frames relays are generally used in narrowband ISDN, also known as first generation ISDN. An improvement over frame relays, cell relays are generally used in broadband ISDN (BISDN), also known as second generation ISDN. Cell relays are synonymous with an interface protocol known as asynchronous transfer mode (ATM). Because ATM holds an important place in networking communication, ATM will be further discussed below.

The principle behind ATM is to take any received information whether it be data, voice or image, and any speed rate of the information, segment the information up into predetermined fixed-length packets such as cells, and attach a header to the individual cells so that the cells can be sent to its destination. Simply stated, ATM has no bearing on the contents of the information or the speed of the information received. It simply segments the information into cells. A cell may comprise a 5 byte header and 48 bytes of information according to one standard. Because ATM uses small, fixed size cells, they can be switched efficiently and at very high transfer rates. Once transmitted in a networking system, the cells are forwarded from link to link until it reaches its destination.

The processing module may have multiple ports to receive multiple communication interface boards used to implement distributed transmission. One problem is the amount of buffer that needs to be allocated for each port such that the fastest communication interfaces could operate without information loss and without compromising speed while accommodating for the slower communication interfaces. Buffers, however, are generally expensive. Typically, in designing a buffer system centrally located in the processing module for accommodating all interfaces, the buffer system needs to be designed based on the maximum thoroughput. As an example, in a processing module with three ports, if the potential transfer rate ranges from 1.5 Megabits/second (Mb/s) (e.g. T1 carrier) to 155 Mb/s (e.g. OC3 carrier) for each port, the buffer size for each port should accommodate the transfer rate of 155 Mb/s. However, in the event that all three communication interface boards inserted use T1 carrier, each buffer size would be excessive leading to inefficient cost usage of the buffers. If the buffer size is compromised, in the event that all three communication interface boards inserted use OC3 carrier, the boards may operate with loss of information and/or compromise in speed. This is generally not desirable.

The processing module may also provide segmentation of information into packets and/or reassembly of packets into information. According to one method, the software that provides such capability to the processing module may also be used to provide a buffer fill management. Generally, at certain intervals, the software polls the buffers to determine if there is room to accept packets. Where the software is not synchronized to the ports of the communication interface boards, either the port capacity is not fully utilized or the queuing entity expends additional resources to check that there is room available in the buffers. This causes the software to be diverted from its main function of segmenting and reassembling information. Where a high rate of segmentation and reassembly is demanded by the processing module, such diversion causes the processing module to perform at less than maximum potential. Furthermore, in certain systems, where various communication boards are used, when one of the boards fail, this creates a bottleneck in the system in which the flow of information is blocked.

SUMMARY OF THE INVENTION

An apparatus is described that provides queuing traffic to many destinations covering a wide range of communication interface speeds while minimizing buffer size. The apparatus may comprise a plurality of communication interface boards that distribute packets which are coupled to a processing module that segments information into variable length and/or fixed length packets. Each communication interface board has an individual packet transmission speed. A buffer is provided in the communication interface boards according to the transmission speed of the board. Other features and advantages of the present invention will be apparent from the accompanying drawings and detailed description to be followed below.

BRIEF DESCRIPTION OF THE DRAWINGS

The present invention is illustrated by way of examples and not as limitations in which the figures of the accompanying drawing in which like references indicate similar elements, and in which;

FIG. 1 is a diagram of a processing module that segments information into packets in which communication interface boards are coupled to;

DETAILED DESCRIPTION

A method and apparatus is described that provides queuing of information to many destinations covering a wide range of communication interface speeds while minimizing queuing buffer size and/or software queue processing overhead in networking systems. The apparatus may comprise a processing module and a plurality of communication interface boards having various transmission speeds that are coupled to the processing module. In one embodiment of the invention, queuing buffers are provided on the communication boards according to the transmission speed of the board. The advantage is that in a system where buffers are provided at the processing module according to maximum board transmission rate, by providing the buffer at the individual communication interface boards, the buffers may be designed according to actual transmission rate of the board. In another embodiment, the buffers may be provided with a flag that indicates to the buffer fill management software that the buffer has room to receive more packets of information. In another embodiment, the processing module may be provided with a small queuing buffer with a timer so that in the event the queued packets can not be distributed to a communication interface board within a predetermined period of time, the packets are purged to receive packets behind it.

Figure 1:
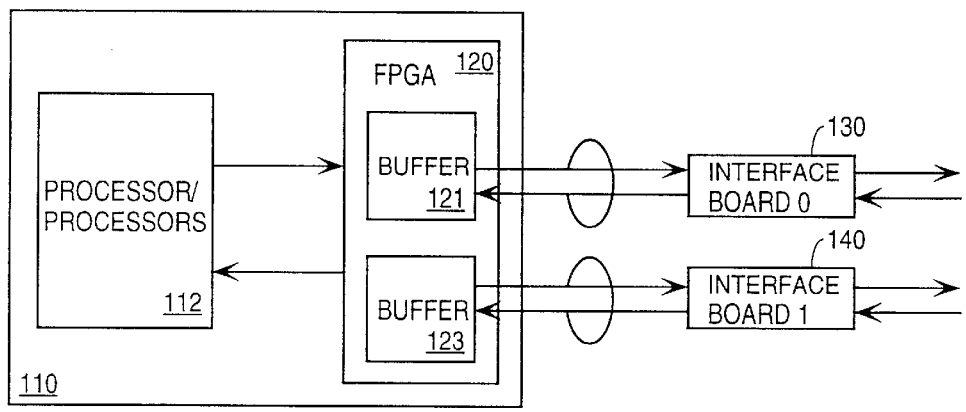

FIG. 1 illustrates an example of a system in which an embodiment of the invention may be implemented. The system may comprise a processing module 110 and various insertable communication interface boards 130, 140 that may have various packet transmission speeds. The number of interfaces may vary dependent on the system design. In this instance, two interfaces are illustrated as interface board 0 and interface board 1. The processing module 110 provides ports or connectors in which the communication interface boards 130, 140 may be connected. Within the processing module 110 is a processor or a plurality of processors 112 that segment information into segmented information which may be variable length packets or fixed length packets, suitable for transmission over the networking system, and/or reassembles received packets to form information. Variable length packets may be frames and fixed length packets may be cells. Accordingly, packets are defined to mean variable length packets or fixed length packets. In the case of transmission, the packets of information are transmitted from the processing module 110 to the various communication interface boards 130, 140 for distribution. Between the processor or the plurality of processors 112 and the communication interface boards 130, 140, there may be a circuit 120 such as a Field Programmable Gate Array (FPGA) that provides speed translation between the processing module 110 and the communication interfaces 130, 140. For example, if the processing module 110 is transmitting information at 400 Mb/s and is connected to two communication interfaces, the FPGA 120 may translate the speed such that each interface receives information at 200 Mb/s. Note that the speed translation may be independent of the number of communication interfaces connected. The speed translation may be dependent on the characteristics of the communication interface, for example, the transmission carrier it is using.

In one method for providing queuing traffic to accommodate a wide range of communication interface speeds, buffers 121, 123 are provided within the FPGA 120, its number corresponding to the number of ports or connectors available at the processing module 110. The size of each buffer 121, 123 is made sufficient to anticipate the various communication interface speeds that may be encountered. Generally, the size of the buffer is designed to accommodate a maximum speed a communication interface board 130, 140 may operate. For example, a communication interface board using OC3 carrier may transmit at the rate of 155 Mb/s. Thus, the size of the buffer would need to accommodate the transmission rate of the OC3 carrier. Because it is not known which interface board 130, 140 connected will transmit on OC3 carrier, each of the buffers have sufficient size to accommodate 155 Mb/s transfers. In the case where inserted communication interface board 130, 140 uses T1 carrier to transmit packets, the transmission rate may be only 1.5 Mb/s. Because each port or connector has an associated buffer with the capacity of 155 Mb/s transmission rate, such a buffer being used to transmit at a 1.5 Mb/s results in a waste of buffer capacity.

Figure 2:
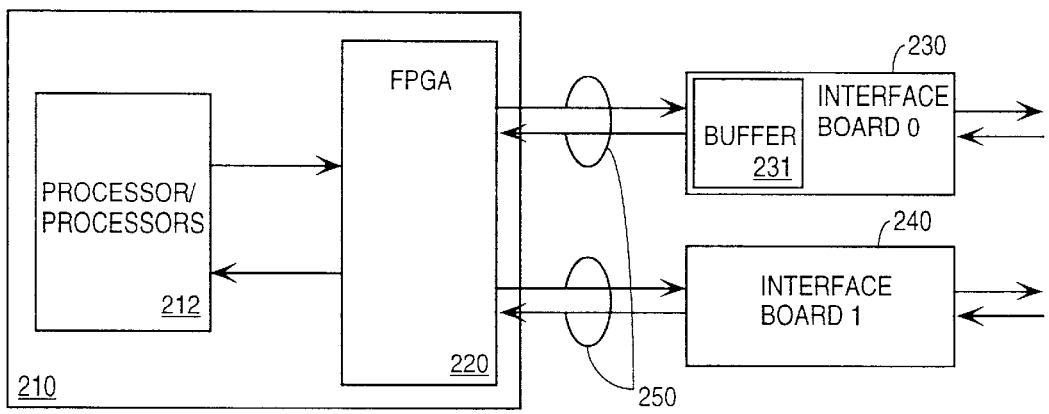
FIG. 2 is a diagram of an embodiment of the invention that illustrates how a size of buffers may be minimized in a system.

FIG. 2 illustrates an example of how the size of the buffers in the system may be minimized according to one embodiment of the invention. Generally, buffering is provided for communication interface boards with high transmission rate. For example, communication interface boards transmitting at OC3 carrier rate of 155 Mb/s may require buffers, however, board transmitting at T1 carrier rate of 1.5 Mb/s may not require buffers at all. As an example, suppose the processing module 210 segments information into cells and transmits to the FPGA 220 at a rate of approximately 118 cells per 125 uSec, where 125 uSec is an example of the interval period in which the software checks for buffer filling. The FPGA 220 may provide speed translation such that each port or connector may be able to accept cells at approximately 59 cells during the interval period. Note that this is the bandwidth associated with the port or connector. In digital communication, generally, cells are not transmitted continuously, instead occur in bursts. A T1 carrier communication interface board in general, receives at approximately 2.5 cells per 125 uSec, thus, the bandwidth is sufficient as not to require additional buffer. Generally, a communication interface board has a physical layer interface that has a small buffer which may be sufficient to accommodate the T1 transmission rate if required. A OC3 carrier communication interface board in general, receives at approximately 46 cells per 125 uSec. While it would seem that the bandwidth is sufficient, the processing module is typically not synchronous to the communication interface boards inserted and therefore, requires a buffer for compensation to ensure that full OC3 transmission rate may be achieved. Otherwise, the speed of the OC3 communication interface board is compromised. By providing the buffer at the individual communication interface boards instead of the processing module 210, buffers may be designed according to actual requirement. Further, because buffers are provided in the communication interface boards, they are no longer required to be accommodated in the FPGA 220 according to one embodiment. Providing buffers in the FPGA is generally limited because the size of the buffers required causes the FPGA's resources to be diverted from its primary task of speed translation. Further, the size of buffer required using FPGA technology is not cost efficient.

As an example, board 230 may be transmitting at OC3 carrier transmission rate, thus a buffer 231 is provided in the board. Board 240 may be transmitting at T1 carrier transmission rate and thus, may not need a buffer. Accordingly, no buffer is provided in board 240. By only providing buffers on boards that require buffering, significant savings in buffers are made.

Figure 3:
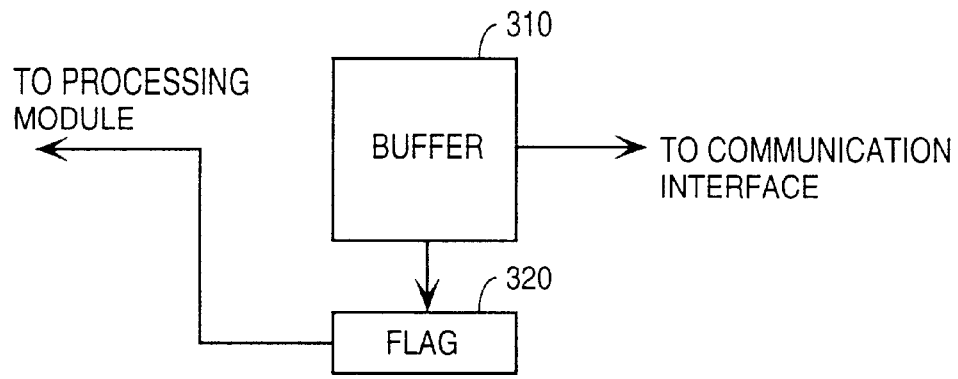
FIG. 3 is a diagram of a buffer having a flag indicating room in the buffer according to one embodiment of the invention.

FIG. 3 illustrates a programmable flag scheme that indicates a fill level of the various buffers in the communication interface boards. As mentioned previously, the software that provides for segmentation and reassembly of information may also provide for buffer fill management. Due to high rate of segmentation and reassembly demanded by the processing module, it is desirable to expend as little software time as possible in buffer fill management. In the case where buffers are implemented in the processing module 110 (see FIG. 1) according to the number of ports or connectors provided, a polling scheme is implemented. Generally, the software would poll each buffer at a predetermined interval to determine if there is room to accept additional cells. Once the fill level of buffers are determined, the processing module 110 would queue the cells to be provided to the various buffers one port or connectors at a time. This generally does not result in the efficient usage of software time.

In FIG. 2, whenever a communication interface board 230, 240 is inserted in a port or connector, an identification signal may be transmitted by the board to the central processing module 210 to indicate its presence. If the communication board 230, 240 is "cold-inserted" (i.e. the subsystem has been shut down), identification signal may be transmitted during start-up. If the communication board 230, 240 is "hot-inserted" (i.e. the system is running), identification signal may be transmitted at approximately the time of insertion. The identification signal may be transmitted through the channel 250 in which the cells are transmitted or received. Alternatively, a separate line may be provided at the port or connector to transmit the identification signal. The processing module 210 receives the identification signal and by processing the signal identifies the type of the communication board. This information may be further conveyed to the software that provides for the buffer fill management so that the software programs for the value n (to be described with respect to FIG. 3 below) associated with for the inserted communication board. The value n may be provided through the identification signal or alternatively, may be provided in a lookup table stored in a memory according to one embodiment.

Referring to FIG. 3, each buffer 310 implemented in a communication interface board may have a programmed flag 320 that indicates when there is room for at least n or more entries where n is a number. The software may be is programmed for the value n for each of the inserted communication interface boards. The software also may read the status of the flag at predetermined intervals which allows a determination of the number of entries that can be queued to a given communication interface board. Because the software does not individually poll the buffers to determine if there is room and if so, the size, less time is required for buffer fill management providing for efficient usage of software time.

Figure 4:
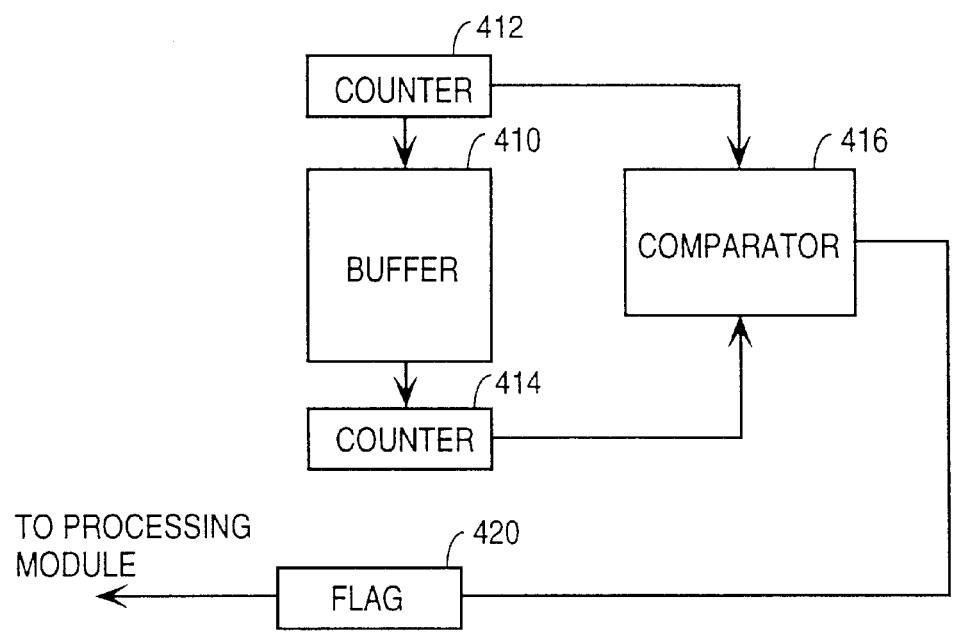
FIG. 4 is a more detailed diagram of the buffer having a flag for indicating room in the buffer according to one embodiment of the invention.

FIG. 4 illustrates one embodiment of implementing a programmed flag 420 in a buffer 410. The buffer may use a first in first out (FIFO) memory in which the first packet written in the buffer is the first packet read out from the buffer. A counter 412 may keep track of the packets that are written into the buffer 410. Another counter 414 may keep track of the packets that are read out of the buffer 410. Using a comparator 416, the two counters may be compared to determine available buffer room. When the buffer room reaches value n, a flag is set that in turn is read by the software during the interval. This indicates to the processing module 110 that room is available in the flagged buffer to receive at least n or more packets. Alternatively, other methods may be used to implement a programmed flag in a buffer.

Figure 5:
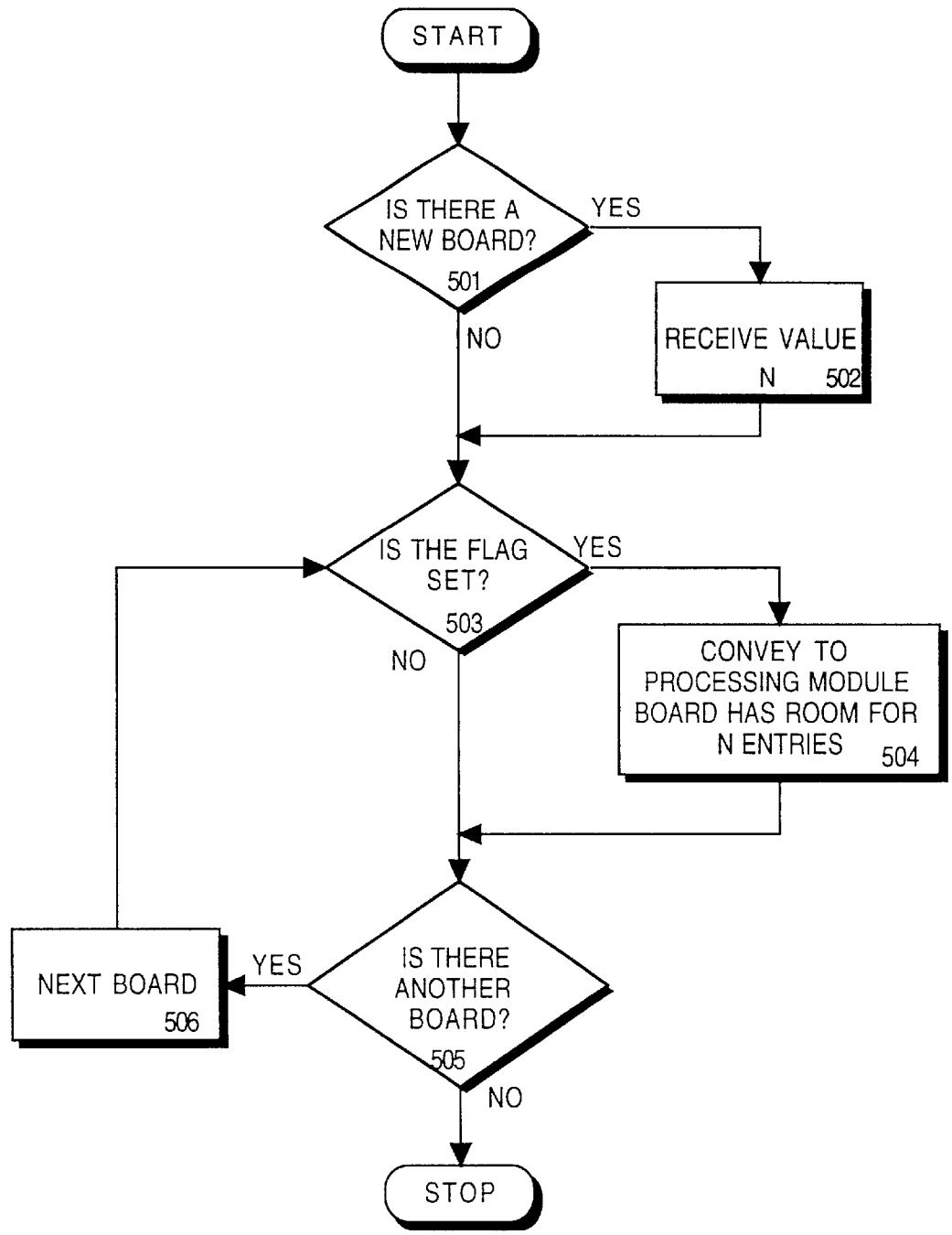
FIG. 5 is a flow chart of a buffer fill management program according to one embodiment of the invention.

FIG. 5 is a flow chart of a buffer fill management program according to one embodiment of the invention. The buffer fill management program determines whether there is room to receive packets in a communication interface board having a buffer. In block 501, a determination is made as to whether a new communication interface board has been inserted in the processing module. If a new board has been inserted, in block 502, a value n may be received corresponding to the inserted board. Each buffer implemented in a communication interface board may have a programmed flag which when set, indicates there is room to receive at least n or more entries of packets. The value n may be received from the communication interface board or alternatively, may be received from a memory when the communication interface board is identified by the processing module. In blocks 503–506, the buffer fill management program polls the flags of the communication interface boards coupled to the processing module to determine flag settings. In block 504, if a flag is set on a communication interface board, the buffer fill management program conveys to the processing module that the communication interface board has room for at least n entries.

Figure 6:
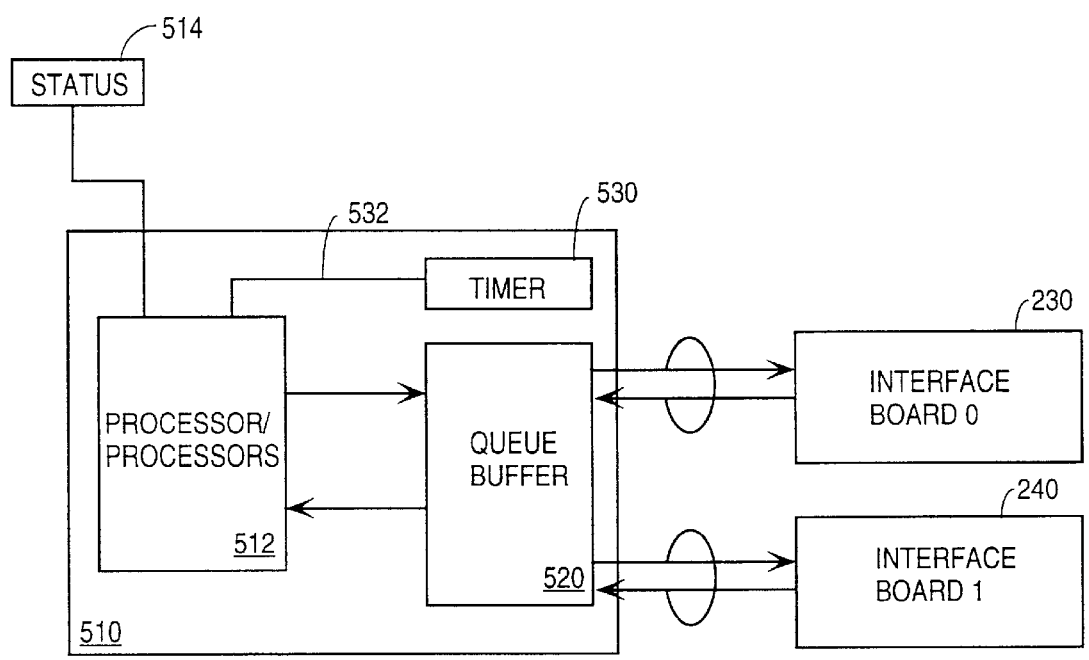
FIG. 6 is a diagram of a processing module having a queue buffer and a timer according to another embodiment of the invention.

FIG. 6 illustrates an embodiment where a failed communication interface board is prevented from causing a processing subsystem to fail. Within the processing module 510, there is provided a queuing buffer 520 that accommodates for all the connected communication interfaces 230, 240. Where a communication interface fails, the passage of queued packets may be blocked thereby the processing module fails. Because the basic queuing mechanism is blocking, it is important that a failed communication interface device does not prevent traffic from being sent to other operational communication interface devices. According to one embodiment, a timer 530 is associated with the queuing buffer 520. The timer is activated as soon as the packets are received by the queuing buffer 520. Within a predetermined period of time, if the packets are not transmitted, a time-out is implemented which causes the waiting packets to be purged from the queue buffer 520 and allow packets behind it to enter the queuing buffer 520. In another embodiment, the timer 530 has a circuit that enables the timer 530 to communicate to the processor or processors 512 of the purged packets. The processor or processors 512 may determine the communication interface board associated with the purged packets and may prevent future packets from being queued for the communication interface board that no longer functions. Further, the processing module 510 may provide a status 514 indicating the board no longer functions. Furthermore, the processor may cause the software to be programmed to bypass the flag of the board that no longer functions thereby minimizing software overhead. When a new communication interface board replaces the non-functioning board, an identification signal transmitted from the new board may cause the processing module to acknowledge the board. The processing module may also convey the information to the software such that buffer fill management may be performed on the new board. The processing module may resume segmenting information into packets for the new board.

In the foregoing specification, the invention has been described with reference to specific exemplary embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. An apparatus comprising:
   a processing module comprising one or more processors to process information into segmented information;
   a plurality of communication interface boards coupled to said processing module, said plurality of communication interface boards to transmit said segmented information, each communication interface board having a set individual transmission speed, wherein, a first communication interface board having a first set transmission speed amongst the transmission speeds offered by said plurality of communication interface boards does not have a buffer outside a physical layer interface that is incorporated onto said first communication board to queue that portion of said segmented information that is sent to said physical layer interface;
   a buffer that is incorporated onto a second communication interface board having a second set transmission speed amongst the transmission speeds offered by said plurality of communication interface boards, the buffer being sized to accommodate said second set individual transmission speed, said buffer to queue segmented information to be transmitted by said second communication interface board, said second set transmission speed higher than said first set transmission speed.

2. The apparatus of claim 1, wherein said segmented information comprises a frame.

3. The apparatus of claim 1, wherein said segmented information comprises a cell.

4. The apparatus of claim 1, further comprising:
   speed translation circuitry coupled between said processing module and said plurality of communication interface boards, said speed translation circuitry to provide a speed translation such that each communication interface board receives its portion of said segmented information at a speed that is sufficient for each communication interface board to transmit its portion at its set individual transmission speed.

5. The apparatus of claim 4, wherein said speed translation circuitry is a Field Programmable Gate Array.

6. The apparatus of claim 1, further comprising:
   software to determine a number of entries that can be queued into said buffer, said determination made at a predetermined interval by said software.

7. The apparatus of claim 6, wherein said software is written to receive a flag at said predetermined interval to said determine said number of entries.

8. The apparatus of claim 7, wherein said flag is sent by said second communication interface board and indicates that said buffer is able to store at least n entries.

9. An apparatus comprising:
   a processing means for segmenting information into packets;
   a plurality of communication interface boards coupled to said processing means, said plurality of communication interface boards for transmitting said packets, each communication interface board set to operate at a set individual transmission speed, wherein, a first communication interface board having a first set transmission speed amongst the transmission speeds offered by said plurality of communication interface boards does not have a buffering means outside a physical layer interface that is incorporated onto said first communication board to queue a first portion of said packets; and
   a buffering means incorporated onto a second communication interface board having a second set transmission speed amongst the transmission speeds offered by said plurality of communication interface boards, said buffering means sized to accommodate said set transmission speed, said second set transmission speed higher than said first set transmission speed, said buffering means to queue a second portion of said packets.

10. The apparatus of claims 9, further comprising:
    a programmable means for determining an amount of available memory in said buffering means, said determination made at a predetermined interval.

11. A method for communicating information, the method comprising:
    segmenting information;
    sending said segmented information to a plurality of communication interface boards, each communication interface board set to operate at a set individual transmission speed;
    not buffering a first portion of said segmented information on a first of said communication interface boards prior to said first portion's entering said first communication interface board's physical layer interface, said first portion to be transmitted from said first communication board at a first transmission speed amongst a plurality of transmission speeds offered by said plurality of communication interface boards;
    buffering a second portion of said segmented information on a second of said communication interface boards, said second portion to be transmitted from said second communication board at a second transmission speed amongst said plurality of transmission speeds, said second transmission speed higher than said first transmission speed; and,
    speed translating between said segmenting and said sending so that each communication interface board receives its portion of said segmented information at a rate that is sufficient for each communication interface board to transmit at its set individual transmission speed.

12. The method of claim 11, wherein said segmented information further comprises a frame.

13. The method of claim 11, wherein said segmented information further comprises a cell.

14. The method of claim 11, wherein said speed translating is implemented with a Field Programmable Gate Array.

15. The method of claim 11, further comprising:
    determining an amount of available room in said buffer at a predetermined interval.

16. The method of claim 15, wherein said determining an amount of available memory in said buffer further comprises executing a plurality of instructions.

17. The method of claim 15, further comprising: providing a flag for said buffer, said flag being set if said buffer has available room to receive segmented information from said processing module.

18. The method of claim 17, wherein said flag is set if there is an available amount of room in said buffer for at least n entries wherein n is an integer.

19. An apparatus, comprising:
one or more processors to:
1) execute software to form segmented information and
2) direct a flow of said segmented information toward a plurality of communication interfaces, said plurality of communication interfaces comprising:
a) a first communication interface downstream from said one or more processors to receive a first portion of said flow, said first communication interface having a first transmission rate and a buffer, said buffer to ensure said first transmission rate is achieved in light of said flow not being timed synchronously with respect to said first communication interface; and,
b) a second communication interface downstream from said one or more processors to receive a second portion of said flow, said second communication interface having a second transmission rate, said second transmission rate less than one hundredth of said first transmission rate, said second communication interface not having a buffer outside said second communication interface's physical layer circuitry to queue any portion of said second portion of said flow that is received by said physical layer circuitry.

20. The apparatus of claim 19 wherein said first transmission rate is an OC3 rate and said second transmission rate is a T1 rate.

21. The apparatus of claim 19 wherein said first communication interface is configured to send a flag toward said one or more processors if said buffer is capable of receiving a specific quantity "n" of said segmented information that is to be associated with said first portion of said flow.

22. The apparatus of claim 21 wherein said flag is readable by said one or more processors.

23. The apparatus of claim 19 wherein said apparatus further comprises a speed translation unit between said one or more processors and said plurality of communication interfaces, said speed translation unit not having a buffer to accommodate said first transmission rate, said speed translation unit not having a buffer to accommodate said second transmission rate, said speed translation unit to receive said flow and to provide:
1) said first portion of said flow to said first communication interface; and
2) said second portion of said flow to said second communication interface.

24. The apparatus of claim 19 wherein said first communication interface is a first communication interface board and said second communication interface is a second communication interface board.

25. The apparatus of claim 24 wherein said first transmission rate is an OC3 rate and said second transmission rate is a T1 rate.

26. The apparatus of claim 24 wherein said first communication interface is configured to send a flag toward said one or more processors if said buffer is capable of receiving a specific quantity "n" of said segmented information that is to be associated with said first portion of said flow.

27. The apparatus of claim 26 wherein said flag is readable by said one or more processors.

28. The apparatus of claim 24 wherein said apparatus further comprises a speed translation unit between said one or more processors and said plurality of communication interfaces, said speed translation unit not having a buffer to accommodate said first transmission rate, said speed translation unit not having a buffer to accommodate said second transmission rate, said speed translation unit to receive said flow and to provide:
1) said first portion of said flow to said first communication interface; and
2) said second portion of said flow to said second communication interface.

29. An apparatus, comprising:
one or more processors to:
1) execute software to form segmented information and
2) direct a flow of said segmented information toward a plurality of communication interfaces, said plurality of communication interfaces comprising:
a) a first communication interface downstream from said one or more processors to receives a first portion of said flow, said first communication interface having a first transmission rate and a buffer, said buffer to ensure said first transmission rate is achieved in light of said flow not being timed synchronously with respect to said first communication interface; and,
b) a second communication interface downstream from said one or more processors to receive a second portion of said flow, said second communication interface having a second transmission rate, said second transmission rate being a lowest transmission rate amongst said first and second communication interfaces, said first transmission rate being a highest transmission rate amongst said first and second communication interfaces, said second communication interface not having a buffer outside said communication interface's physical layer circuitry to queue any portion of said second portion of said flow that is received by said physical layer circuitry.

30. The apparatus of claim 29 wherein said first transmission rate is an OC3 rate and said second transmission rate is a T1 rate.

31. The apparatus of claim 29 wherein said first communication interface is configured to send a flag toward said one or more processors if said buffer is capable of receiving a specific quantity "n" of said segmented information that is to be associated with said first portion of said flow.

32. The apparatus of claim 31 wherein said flag is readable by said one or more processors.

33. The apparatus of claim 29 wherein said apparatus further comprises a speed translation unit between said one or more processors and each of said first and second communication interfaces, said speed translation unit not having a buffer to accommodate said first transmission rate, said speed translation unit not having a buffer to accommodate said second transmission rate, said speed translation unit to receive said flow and to provide:
1) said first portion of said flow to said first communication interface; and
2) said second portion of said flow to said second communication interface.

34. The apparatus of claim 29 wherein said first communication interface is a first communication interface board and said second communication interface is a second communication interface board.

35. The apparatus of claim 34 wherein said first transmission rate is an OC3 rate and said second transmission rate is a T1 rate.

36. The apparatus of claim 34 wherein said first communication interface is configured to send a flag toward said one or more processors if said buffer is capable of receiving a specific quantity "n" of said segmented information that is to be associated with said first portion of said flow.

37. The apparatus of claim 36 wherein said flag is readable by said one or more processors.

38. The apparatus of claim 34 wherein said apparatus further comprises a speed translation unit between said one or more processors and each of said first and second communication interfaces, said speed translation unit not having a buffer to accommodate said first transmission rate, said speed translation unit not having a buffer to accommodate said second transmission rate, said speed translation unit to receive said flow and to provide:

1) said first portion of said flow to said first communication interface; and
2) said second portion of said flow to said second communication interface.

39. An apparatus, comprising:
a processing module to:
1) form segmented information and
2) direct a flow of said segmented information toward a plurality of communication interfaces, said plurality of communication interfaces comprising:
    a) a first communication interface downstream from said processing module to receive a first portion of said flow, said first communication interface having a first transmission rate and a buffer, said buffer to ensure said first transmission rate is achieved in light of said flow not being timed synchronously with respect to said first communication interface; and,
    b) a second communication interface downstream from said processing module to receive a second portion of said flow, said second communication interface having a second transmission rate, said second transmission rate less than one hundredth of said first transmission rate, said second communication interface not having a buffer outside said communication interface's physical layer circuitry to queue any portion of said second portion of said flow that is received by said physical layer circuitry.

40. The apparatus of claim 39 wherein said first transmission rate is an OC3 rate and said second transmission rate is a T1 rate.

41. The apparatus of claim 39 wherein said first communication interface is configured to send a flag toward said processing module if said buffer is capable of receiving a specific quantity "n" of said segmented information that is to be associated with said first portion of said flow.

42. The apparatus of claim 41 wherein said flag is readable by said processing module.

43. The apparatus of claim 39 wherein said apparatus further comprises a speed translation unit between said processing module and said plurality of communication interfaces, said speed translation unit not having a buffer to accommodate said first transmission rate, said speed translation unit not having a buffer to accommodate said second transmission rate, said speed translation unit to receive said flow and to provide:

1) said first portion of said flow to said first communication interface; and
2) said second portion of said flow to said second communication interface.

44. The apparatus of claim 39 wherein said first communication interface is a first communication interface board and said second communication interface is implemented with a second communication interface board.

45. The apparatus of claim 44 wherein said first transmission rate is an OC3 rate and said second transmission rate is a T1 rate.

46. The apparatus of claim 44 wherein said first communication interface is configured to send a flag toward said processing module if said buffer is capable of receiving a specific quantity "n" of said segmented information that is to be associated with said first portion of said flow.

47. The apparatus of claim 46 wherein said flag is readable by said processing module.

48. The apparatus of claim 44 wherein said apparatus further comprises a speed translation unit between said processing module and said plurality of communication interfaces, said speed translation unit not having a buffer to accommodate said first transmission rate, said speed translation unit not having a buffer to accommodate said second transmission rate, said speed translation unit to receive said flow and to provide:

1) said first portion of said flow to said first communication interface; and
2) said second portion of said flow to said second communication interface.

49. An apparatus, comprising:
a processing module to:
1) form segmented information and
2) direct a flow of said segmented information toward a plurality of communication interfaces, said plurality of communication interfaces comprising:
    a) a first communication interface downstream from said processing module to receive a first portion of said flow, said first communication interface having a first transmission rate and a buffer, said buffer to ensure said first transmission rate is achieved in light of said flow not being timed synchronously with respect to said first communication interface; and,
    b) a second communication interface downstream from said processing module to receive a second portion of said flow, said second communication interface having a second transmission rate, said second transmission rate being a lowest transmission rate amongst said first and second communication interfaces, said first transmission rate being a highest transmission rate amongst said first and second communication interfaces, said second communication interface not having a buffer outside said communication interface's physical layer circuitry to queue any portion of said second portion of said flow that is received by said physical layer circuitry.

50. The apparatus of claim 49 wherein said first transmission rate is an OC3 rate and said second transmission rate is a T1 rate.

51. The apparatus of claim 49 wherein said first communication interface is configured to send a flag toward said processing module if said buffer is capable of receiving a specific quantity "n" of said segmented information that is to be associated with said first portion of said flow.

52. The apparatus of claim 51 wherein said flag is readable by said processing module.

53. The apparatus of claim 49 wherein said apparatus further comprises a speed translation unit between said processing module and each of said first and second communication interfaces, said speed translation unit not having a buffer to accommodate said first transmission rate, said speed translation unit not having a buffer to accommodate said second transmission rate, said speed translation unit to receive said flow and to provide:

1) said first portion of said flow to said first communication interface; and
2) said second portion of said flow to said second communication interface.

54. The apparatus of claim 49 wherein said first communication interface is a first communication interface board and said second communication interface is a second communication interface board.

55. The apparatus of claim 54 wherein said first transmission rate is an OC3 rate and said second transmission rate is a T1 rate.

56. The apparatus of claim 54 wherein said first communication interface is configured to send a flag toward said processing module if said buffer is capable of receiving a specific quantity "n" of said segmented information that is to be associated with said first portion of said flow.

57. The apparatus of claim 56 wherein said flag is readable by said processing module.

58. The apparatus of claim 54 wherein said apparatus further comprises a speed translation unit between said processing module and each of said first and second communication interfaces, said speed translation unit not having a buffer to accommodate said first transmission rate, said speed translation unit not having a buffer to accommodate said second transmission rate, said speed translation unit to receive said flow and to provide:

1) said first portion of said flow to said first communication interface; and
2) said second portion of said flow to said second communication interface.

59. A method, comprising:
directing a flow of segmented information toward a plurality of communication interfaces and transmitting said flow of segmented information from said plurality of communication interfaces, comprising:
(i) upon a first board having a first communication interface:
receiving a first portion of said flow asynchronously with respect to said first communication interface;
buffering said first portion after said receiving, said buffering to accommodate said asynchronous receiving of said first portion;
transmitting said first portion, after said buffering, from said first communication interface at a highest transmission speed from amongst those transmission speeds employed by said plurality of communication interfaces during said transmitting; and,
(ii) upon a second board having a second communication interface:
not buffering a second portion of said flow prior to said second flow being received by said second board's physical layer circuitry;
transmitting said second portion of said flow from said physical layer circuitry of said second communication interface, said second communication interface having a lowest transmission speed from amongst said those transmission speeds.

60. The method of claim 59 wherein said lowest transmission speed is less than a hundredth of said highest transmission speed.

61. The method of claim 60 wherein said first transmission speed is an OC3 rate and said second transmission speed is a T1 rate.

62. The method of claim 59 further comprising segmenting said information prior to said directing and said transmitting.

63. The method of claim 62 wherein said segmenting is performed with software that is executed upon a processor.

64. The method of claim 59 further comprising sending a flag from said first board if said buffer is capable of receiving a specific quantity "n" of segmented information that is to be associated with said first portion of said flow.

* * * * *